CONTROL ARRANGEMENT FOR A COMMUNICATION SWITCHING NETWORK

Filed March 16, 1965 6 Sheets-Sheet 1

(LINK MEMORY ELEMENT)

(SWITCHING NETWORK)

INVENTOR
F. L. SINGER
BY John C Albrecht
ATTORNEY

CONTROL ARRANGEMENT FOR A COMMUNICATION SWITCHING NETWORK

Filed March 16, 1965 6 Sheets-Sheet 2

DELAY CIRCUIT (INTERROGATION PULSE GENERATOR)

(LOGIC ARRANGEMENT)

(LINK SELECTION AND PREFERENCE CIRCUIT)

United States Patent Office 3,415,955
Patented Dec. 10, 1968

3,415,955

CONTROL ARRANGEMENT FOR A COMMUNICATION SWITCHING NETWORK

Frederick L. Singer, New Shrewsbury, N.J., assignor to Bell Telephone Laboratories, Incorporated, New York, N.Y., a corporation of New York Filed Mar. 16, 1965, Ser. No. 440,264
13 Claims. (Cl. 179—18)

ABSTRACT OF THE DISCLOSURE

A control arrangement is disclosed for selecting an idle path between two defined terminals of a three-stage switching network. Transfluxors are coupled to the output links of the first two stages of the switching network so that the transfluxors are set to a busy state when a connection is established over the corresponding output link and reset to an idle state by signals on the transmission path of the associated output link.

This invention relates to communication switching systems and, more particularly, to an end-marked switching network for such systems.

Communication switching systems are often classified in accordance with the type of switching network employed in the system. There are three basic classes of telephone switching networks; namely, (A) Space Division Networks,
(B) Time Division Networks,
(C) Frequency Division Networks.

The present invention relates to a space division switching network and, more particularly, to an end-marked space division network which employs electromechanical crosspoints.

Space division networks have been implemented by electromechanical devices such as step-by-step switches, crossbar switches and relays and by electronic devices such as gas tube and transistor crosspoints. The gas tube and transistor crosspoint space division networks in some instances take advantage of the lockout characteristics of such devices to provide end-marked networks in which a network path is established by applying marking potentials to the network terminals to be interconnected. In such end-marked networks terminal and internal node holding potentials maintain a path in the conductive state after it has been established under the control of the network marking potentials, and, when such paths are to be released, the terminal holding potentials are removed and the links of the path are thus released. The transmission paths through such electronic networks usually are unbalanced single wire circuits.

In systems employing such networks supervisory signaling between connected devices such as lines and trunks is performed by control arrangements external to the network.

Prior art electromechanical switching networks generally provide balanced 2-wire or 4-wire transmission paths, and supervisory signaling between connected devices may be by way of a switched sleeve conductor or by means of control arrangements external to the network. Examples of systems which employ electromechanical space division switching networks having sleeve conductors are the Bell System crossbar system and the Strowger step-by-step systems. A system which employs a space division electromechanical switching network without a sleeve conductor is described in the copending application of A. H. Doblmaier-R. W. Downing-M. P. Fabisch-J. A. Harr-H. F. May-J. S. Nowak-F. F. Taylor-W. Ulrich, Ser. No. 334,875, filed Dec. 31, 1963 and such a system is described in the Bell System Technical Journal for Sept. 1964. The network for this system is described particularly in Part 2 of this issue starting at pages 2193 and 2221. In the system of Doblmaier et al. a network map is maintained in a bulk temporary memory and the network map is a record of the busy-idle states of all of the links of the network.

There are many telephone switching systems which employ 4-wire networks and the provision of electromechanical crosspoints which have five sets of contacts for switching the four transmission conductors and the sleeve conductor creates a substantial problem.

Accordingly, it is an object of this invention to maintain a record of the busy-idle states of the possible paths through the network by means of memory elements which are controlled directly by the network transmission and control paths.

In accordance with one feature of this invention a multistage switching network is constructed of a plurality of electromechanical crosspoint switches, each switch having a plurality of input links and a plurality of output links and the output links of the switches of each stage except the last include a busy-idle memory element which is responsive to network control signals for setting the busy-idle element to a first busy state and responsive to control signals over the transmission conductors of the output link for resetting the memory element to a second idle state.

In accordance with another feature of this invention a multiaperture transfluxor is employed as the output link busy-idle element and thus link busy-idle supervision is maintained without the use of sleeve conductors and without imposing any bridging loss on the transmission paths of the network.

The above and other objects and features of this invention may be understood from the following description of the illustrative embodiment when read with respect to the drawing in which.

Figure 1:
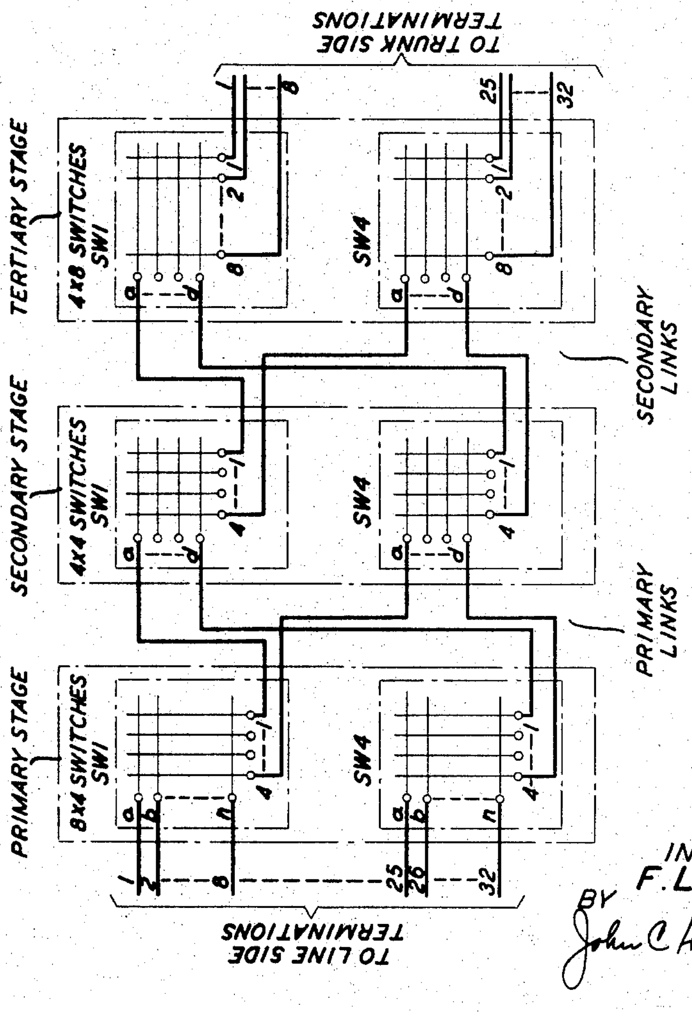
FIG. 1 is a schematic diagram of a three stage space division switching network.

The switching network of FIG. 1 comprises three stages of switching and each switching stage comprises a plurality of independent switches. This network provides a plurality of paths (four) between any selected primary stage input link and any selected tertiary stage output link. Both the primary and tertiary stages provide concentration between the input and output links. In the primary stage there are fewer output links than input links and in the tertiary stage there are fewer input links than there are output links. In the illustrative embodiment of FIG. 1 the primary stage comprises four 8-input 4-output switches and thus serves 32 input terminals. In this illustrative embodiment telephone line circuits terminate on the input terminals of the primary stage and trunk circuits terminate on the output links of the third stage. The output links of each switch of the primary stage are distributed across the switches of the secondary stage. That is, as seen in FIG. 1, the No. 1 output link of the first switch of the primary stage terminates on the first input link of the first switch of the secondary stage and the fourth output link of the first switch of the primary stage terminates on the first input link of the fourth switch of the secondary stage. Similarly, the output links of the remaining primary stages are distributed across the switches of the secondary stage and the output links of the switches of the secondary stage are distributed across the switches of the tertiary stage.

The four possible paths between any particular primary stage input link and any particular tertiary stage output link can be readily seen from the wiring arrangement of FIG. 1. For example a first path between any input link of the first switch of the primary stage and any output link of the first switch of the tertiary stage may be established via the first output link of the first switch of the primary stage, a crosspoint of the first switch of the secondary stage and the first output link of that first switch of the secondary stage. Another possible path includes the fourth output link of the first of the primary stage, a crosspoint of the fourth switch of the secondary stage and the first output link of the fourth switch of the secondary stage. The two additional paths through the second and third switches of the secondary stage are not shown in the figure. As will be seen later herein, there are provided means for testing the availability of the fourth possible paths between the selected primary stage input link and a selected tertiary stage output link and means for enabling a control path for establishing a connection between the selected links on an ordered basis. In the illustrative embodiment the four possible paths are arranged in a preference chain and the lowest numbered idle path is the one which is employed in establishing the desired connection. Path selection and control path enablement will be described in greater detail later herein.

Figure 2:
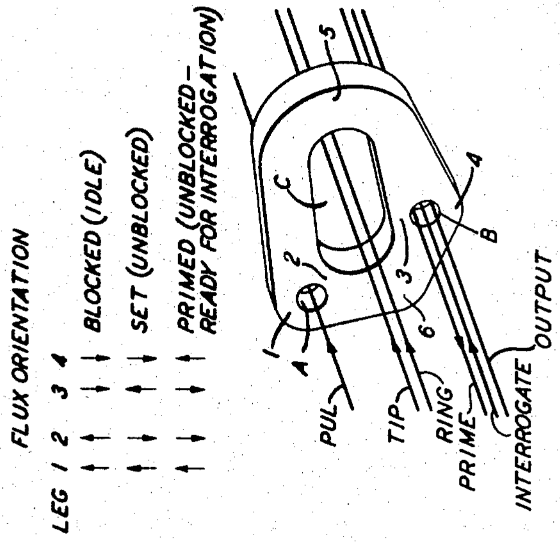
FIG. 2 is a detailed diagram of an output link busy-idle element employed in the illustrative embodiment.

Each output link of the primary and secondary stages includes a busy-idle element for defining the busy and idle states of the link. The busy-idle memory element in the illustrative embodiment comprises a three aperture transfluxor wired as shown in FIG. 2. The transfluxor of FIG. 2 has two small apertures A and B and one large aperture C. The cross sections of legs 1, 2, 3 and 4 adjacent to the apertures A and B are each one-half of the cross section of the legs 5 and 6 which are adjacent to aperture C. The transfluxor has two basic stable states; namely, the blocked or idle state and the unblocked or busy state. Additionally, the transfluxor when in the unblocked state may be placed in one of two conditions; namely, the set state and the primed state. When the transfluxor is in the primed state, as will be described later herein, it is ready for interrogation.

The chart in FIG. 2 shows the flux orientations of the four legs adjacent to the A and B apertures for the various transfluxor states. The transfluxor is placed in the idle or blocked state by passing a relatively large current over the tip and ring conductors in the direction shown in FIG. 2. As a result of such currents, legs 1 and 2 are switched or held in the "up" direction while legs 3 and 4 are switched or held in the "down" direction. That is, for the direction of current shown on the tip and ring conductors a clockwise magnetic field is induced in the transfluxor.

A relatively low magnitude steady state prime current is maintained on the prime conductor in the direction shown. The value of this current is sufficient to switch the magnetic material in the legs 3 and 4 when the transfluxor is in the unblocked state but is insufficient to switch any portion of the transfluxor when it is in the blocked state. The transfluxor is interrogated by passing a relatively low magnitude current pulse over the interrogate conductor in the direction shown. The value of this signal again is sufficient to switch legs 3 and 4 when the transfluxor is in the unblocked primed state, however, is not sufficient to perform any switching when the transfluxor is in the blocked state. That is, if the transfluxor is in the idle state, the interrogate pulse will perform no switching and only a very small output will be obtained on the output conductors which are also threaded through the B aperture. However, if the transfluxor is in the primed unblocked state, the interrogate pulse will cause a switching of legs 3 and 4 and a substantial output signal will be obtained on the output conductor. The utilization of this output information resulting from the application of the interrogate pulses is described later herein.

After an idle path has been found, potentials are applied to the control conductor of an input link of a primary stage and to the control conductor of an output link of a tertiary stage. These potentials cooperate to provide a relatively large current pulse for effecting control of the crosspoints in the network and this control signal which is passed over the PUL conductor of the transfluxors of the chosen idle path will effect switching of the transfluxor from the blocked idle to the unblocked set state. The pulse is passed over the PUL conductor in the direction shown in FIG. 2 and this pulse tends to set leg 1 "up" and to set leg 2 "down." Since leg 1 is previously in the "up" state, one of the legs 3 or 4 must be changed if the state of leg 2 is to be effected. In the configuration shown a signal on the PUL conductor, which tends to switch leg 2 to the "down" state, also tends to switch leg 3 to the "up" state while not disturbing leg 4. The state of the legs 1 through 4 when the transfluxor is in the set unblocked state is shown in the second row of the table.

As previously indicated, the relatively small prime current which flows in the direction shown in the drawing is sufficient to reverse the field around the B aperture when the transfluxor is in the unblocked state. Accordingly, the prime current changes the transfluxor from the set unblocked state to the primed unblocked state wherein the states of the legs 1 through 4 are as shown in row 3 of the table. In this state the transfluxor is ready for interrogation and a unipolar interrogate pulse will switch the transfluxor from the primed unblocked state to the set unblocked state to provide an output signal. After the interrogate pulse has been terminated, the steady state prime current will then change the transfluxor from the set unblocked state to the primed unblocked state to prepare it for subsequent interrogation.

Figure 3C:
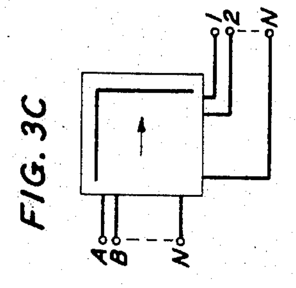
FIG. 3C is a symbolic representation of switches employed in all but the secondary stage.
Figure 3D:
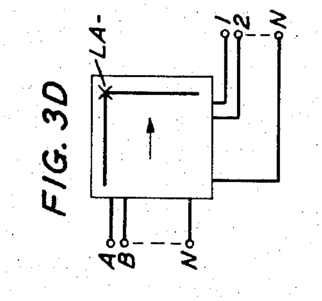
FIG. 3D is a symbolic representation of a secondary stage switch.
Figure 3B:
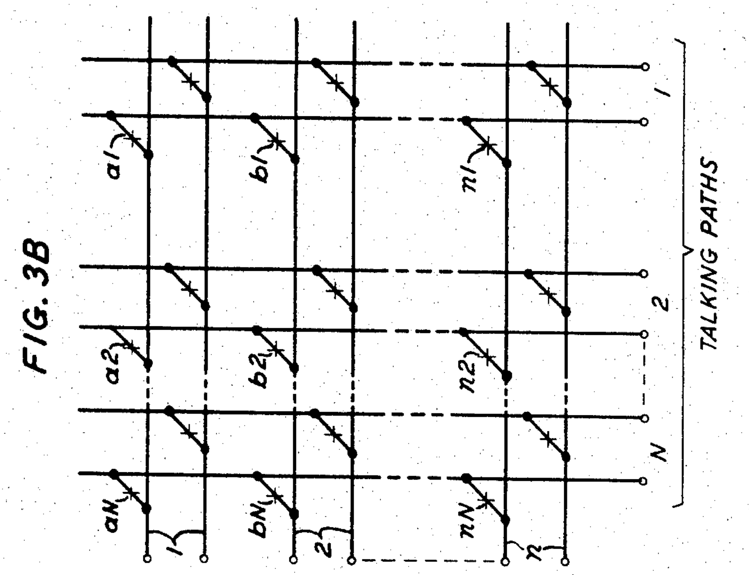
FIG. 3B shows the transmission paths associated with the control conductors of FIG. 3A.
Figure 3A:
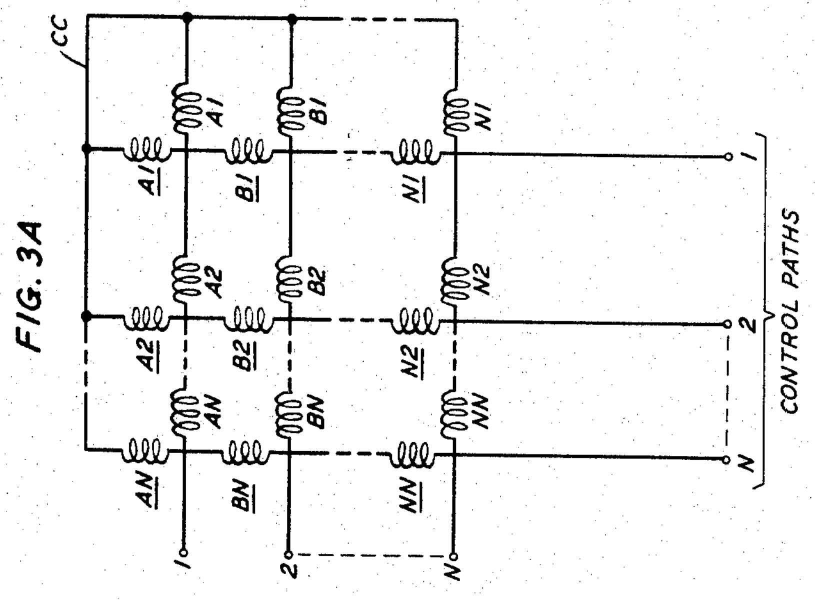
FIG. 3A is a schematic representation of the control conductors of one switch of a network of FIG. 1.

The control and transmission paths of a typical switch employed in the network of FIG. 1 are shown in FIGS. 3A and 3B. Each crosspoint of the switch comprises a differentially wound ferreed switch. A differentially wound ferreed switch has two coils such as A1 and $\underline{A1}$ and includes remanent magnetic material which controls the contacts associated with the crosspoint. Differentially wound ferreed switches are described in U.S. Patent No. 3,037,085 and in the Bell System Technical Journal for January 1960, vol. 39, No. 1, at pp. 1 through 30, in an article entitled "The Ferreed—A New Switching Device" by Messrs. A. Feiner, C. A. Lovell, T. N. Lowry and P. G. Ridinger. The contacts of a differentially wound ferreed switch are closed in response to coincident currents through the coils A1 and $\underline{A1}$ and are released when a current is passed individually through either of these coils. The coils of a crosspoint are arbitrarily called column coils ($\underline{A1}$, $\underline{B1}$, et cetera) and row coils (A1, A2, et cetera). In the illustrative embodiment the ferreed switches are arranged in a rectangular matrix array and the column coils of the switches of a column are serially connected by a column control conductor and the row coils of the switches of a row are serially connected by a row control conductor. The switching network of FIG. 1 is assumed to be a 2-wire network; therefore, there are two sets of contacts associated with each of the crosspoint switches. The transmission paths which are switched by the crosspoint devices are illustrated schematically in FIG. 3B. A connection is established through the switch by applying cooperating potentials to the control conductors associated with the input and output links to be interconnected through the switch. For example, the application of potentials to the control conductor of the first input link and the first output link will cause current to flow through the row windings AN, A2, A1, the common conductor CC and column coils A1, B1 and N1. Such current flow will cause the contacts *a*1 associated with the coils A1 and A1 to close and thus establish a transmission path between the first input link and the first output link. The other crosspoints of the row associated with the first input link and the other crosspoints of the column associated with the first output link all receive signals which tend to release the contacts associated with these crosspoints. That is, if input link 1 had been previously connected to an output link other than output link 1, such connection would be broken at the time the new path is established. Similarly, if the output link 1 had been previously connected to one of the input links other than input link 1, such connection would be broken at the time the new path is established. FIG. 3C illustrates a symbol employed in the remaining figures to represent the arrangements of FIGS. 3A and 3B. FIG. 3D shows a symbol which is employed in the remaining drawings to represent the control arrangement of FIG. 3A modified to include a set of relay contacts in the common conductor CC in that portion of the common conductor which joins the row conductors to the column conductors.

Figure 4:
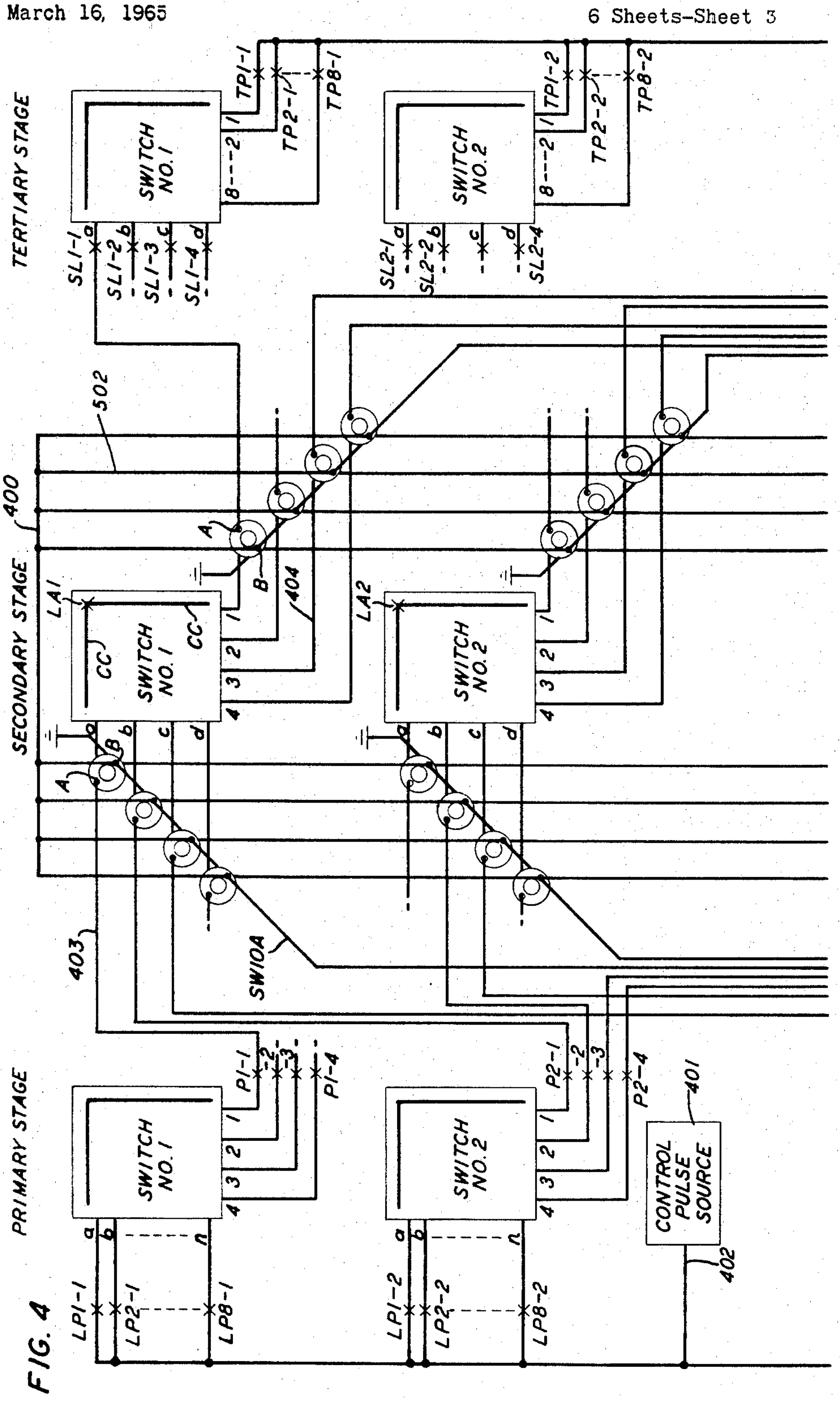
FIGS. 4 and 5 show the wiring of the memory elements for a network such as is shown in FIG. 1.
Figure 5:
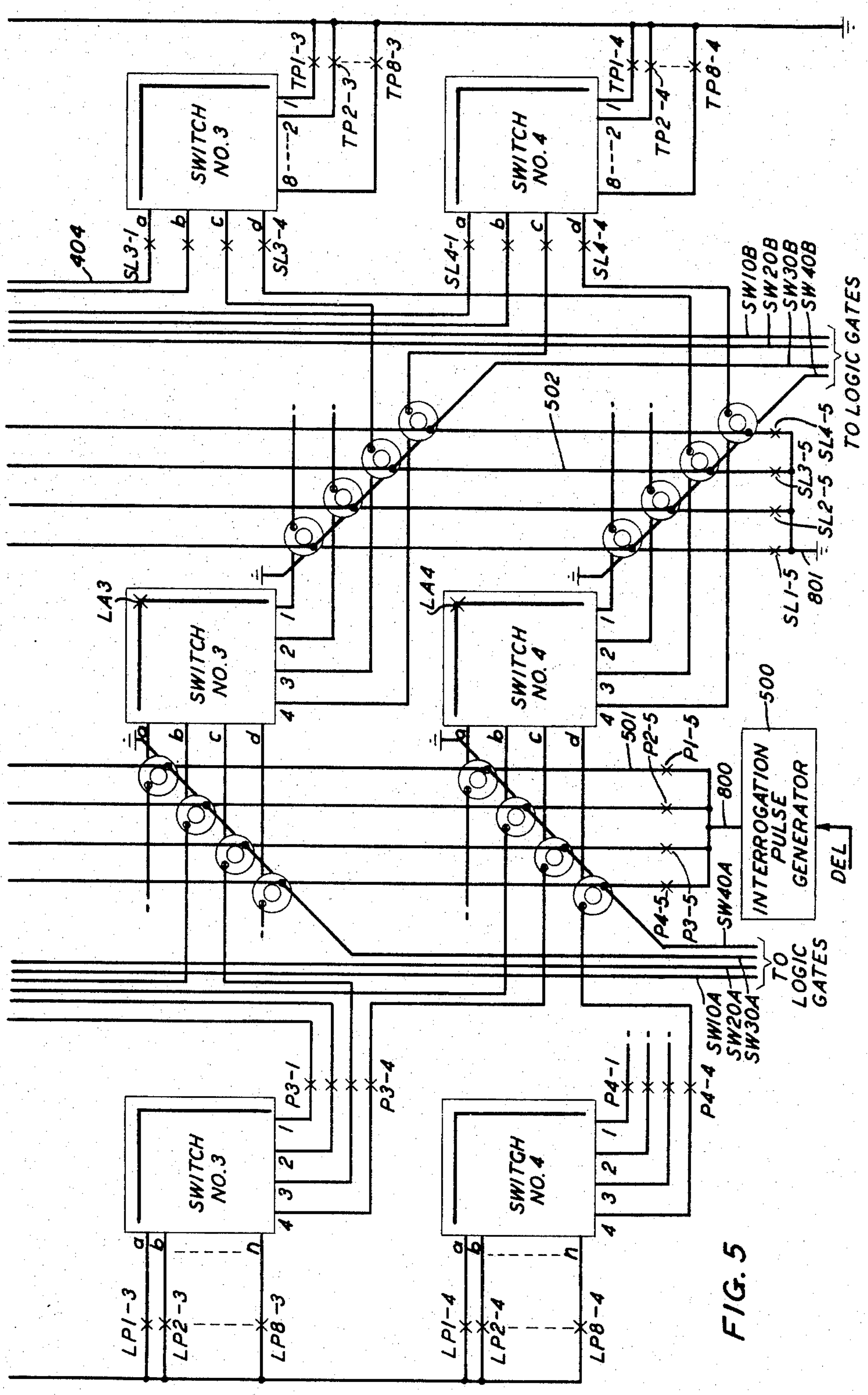

A more detailed showing of the wiring of the memory elements into "interrogation" and "output" groups and provisions for controlling the network are shown in FIGS. 4 and 5. As in FIG. 1, FIGS. 4 and 5 show the control paths for a three stage switching network with each stage containing four switches. The switches of the primary stage each serve eight input links and each has four output links. The secondary stage comprises four switches having four input links and four output links. The switches of the tertiary stage have four input links and eight output links. The link wiring pattern for the network of FIGS. 4 and 5 corresponds to the wiring pattern described with respect to FIG. 1. That is, the network of FIGS. 4 and 5 provides four possible paths between an input line served by a primary stage switch and any output link served by a tertiary stage switch. One path of each of said such groups of paths is provided by way of each of the four secondary switches.

The output link memory elements of each switching stage having such memory elements are arranged in an array comprising a plurality of first (interrogation) groups and a plurality of second (output) groups. Each element of an array is a member of both one of the first groups and one of the second groups. In FIGS. 4 and 5 there are illustrated two such arrays, the first array being associated with the output links of the primary stage and the second array being associated with the output links of the secondary stage. As seen in FIGS. 4 and 5, the output groups correspond to the secondary switch to which the links served by the memory elements of these groups are connected. For example, there is a first output group of the memory array for the ouput links of the primary stage which is associated with the No. 1 secondary switch. Similarly, there are other output groups associated with the input links of the second, third and fourth switches of the secondary stage. As seen in FIG. 4, the output links of each secondary stage switch have memory elements which are arranged in output groups. In summary, in each memory array there are four output groups and each output group comprises four cores. The output conductors which thread the B apertures of the transfluxors of an output group are labeled in accordance with the number of the secondary stage switch served by that group and an alphabetical designation indicating the particular array to which the group belongs. For example, the output conductor which threads the memory elements of the output links which are connected to the input links of the first switch of the secondary stage is labeled SW10A which means switch 1, output, primary stage. Similarly, the output conductor which is associated with the output links of the second switch of the secondary stage is labeled SW20B meaning switch 2, output, secondary stage.

The arrangement of the cores of an array such as the cores associated with the output links of the primary stage into interrogate groups is also easily seen from an examination of FIGS. 4 and 5. The interrogate conductors are shown each threading the B aperture of one transfluxor of an output link connected to each of the secondary stage switches. A similar group exists in the memory array associated with the output links of the secondary stage switches and again an interrogate group comprises one transfluxor of an output link of each of the secondary stage switches.

The relays which are employed in applying interrogate potentials and marking potentials are not shown in detail but, rather, only the contacts of these relays are shown. In this one illustrative embodiment the four possible paths between a selected primary stage input link and a selected tertiary stage output link are simultaneously interrogated to determine the availability of the four paths and a preference chain circuit is employed to always choose the lowest numbered idle path available for effecting the desired connection. The possible paths of a group are identified in accordance with the number of the secondary stage switch which serves the path.

A group of paths is interrogated by operating one of the four P relays P1, P2, P3, P4 associated with the switches of the primary stage and simultaneously operating one of the relays SL1, SL2, SL3, SL4 associated with the switches of the tertiary stage. Assume for example that a path is to be established between one of the input links of the No. 1 switch of the primary stage and one of the output links of the third switch of the tertiary stage. In this case, relays P1 and SL3 will be simultaneously operated to effect the desired interrogation of the four possible paths. As seen at the bottom of FIG. 5, contacts of the P and SL relays selectively apply the output of the interrogation pulse generator 500 and ground potential to the two interrogation groups which serve the four possible paths between the first switch of the primary stage and the third switch of the tertiary stage. That is, the interrogation pulse generator 500 is connected to the interrogation conductor 501 via contact P1–5 and ground potential is connected to the interrogation conductor 502 via contact SL3–5. The path is thus completed between the interrogation pulse generator 500 and ground potential. This path includes the interrogation conductor 501 which threads B apertures of memory elements of output links connected to each of the four secondary switches and conductor 501 is connected via conductor 400 to one end of each of the four secondary stage interrogation conductors. Thus, in the example, a path is completed to ground via interrogation conductor 502 and contact SL3–5. As seen in FIG. 4 and 5, interrogation conductor 502 threads the B apertures of four memory elements associated with individual output links of the four secondary stage switches. Since only one memory element of each output group is interrogated, the information on the output conductor of that group will reflect the state only of the particular transfluxor interrogated. As previously indicated, an idle link is represented by a transfluxor being in the blocked or idle state while a busy link is indicated by a transfluxor being in the unblocked prime state.

A combining of the information on the output conductors of the two output groups associated with a secondary stage switch serves to define the busy-idle state of the two links of each of the four paths. For example, if the information on output conductors SW10A and SW10B indicates that the interrogated memory elements are both in the idle state, then the path which is provided by way of the first secondary stage switch is available; however, if either of these conductors indicates that one of the two interrogated memory elements is in the unblocked primed state, then this path is not available. The utilization of the information on the output conductors SW10A, SW20A, SW10B, SW20B, et cetera, is described later with respect to FIG. 6. It should be noted that other contacts of the P and SL relays are associated with the control paths of the primary stage and tertiary stage switches; that is, the P1 relay has contacts in series with each of the control conductors of the output links of the first switch of the primary stage and the relay SL1 has contacts in series with the control conductors of each of the input links of the first switch of the tertiary stage.

Having completed the description of the organization of the memory elements into arrays and into groups within the arrays, we will now proceed to a discussion of the interrogation of the arrays and the utilization of the resulting array output information in establishing the desired connection between a selected primary stage input link and a selected tertiary stage output link.

Figure 6:
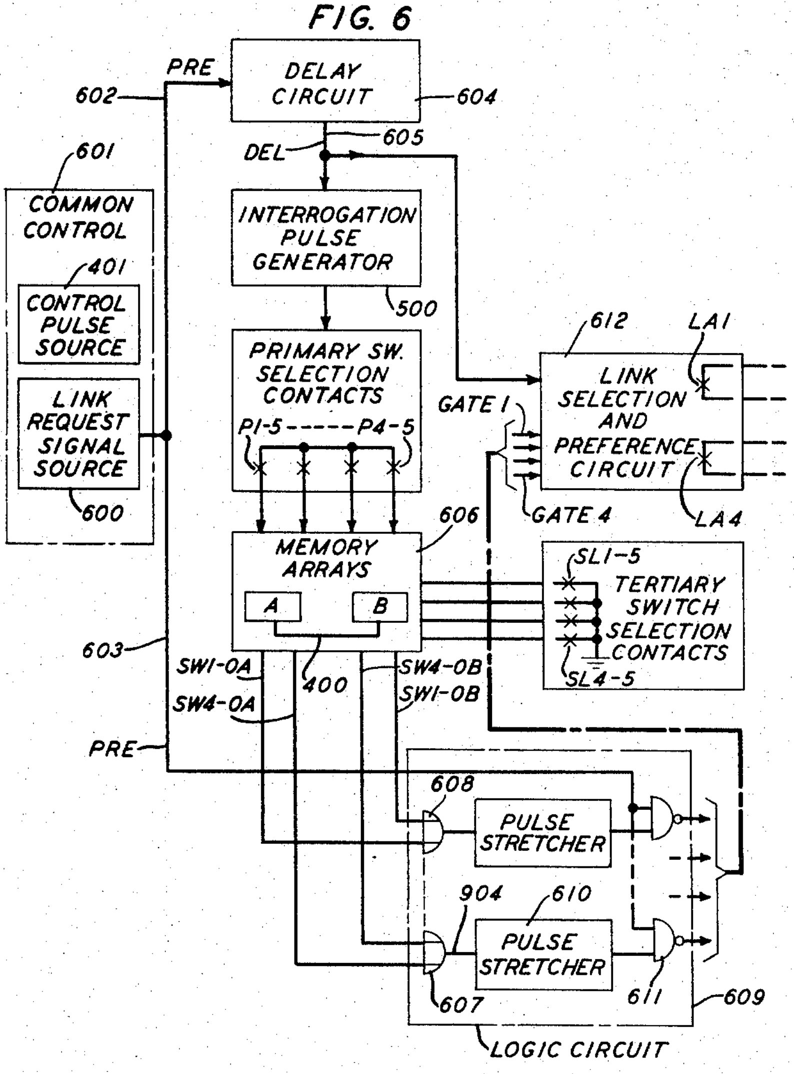
FIG. 6 is a block diagram of a system for interrogating the memory elements of FIGS. 4 and 5 and for controlling the establishment of a connection through such a switching network.

In FIG. 6 there is shown the link request signal source 600 which is a portion of the larger common control unit 601 which is not shown in detail herein. An understanding of the common control functions is not essential for a full understanding of the inventive concepts of the illustrative embodiment. The link request signal source 600 provides a link request signal labeled PRE on conductors 602 and 603. The link request signal source in this illustrative embodiment is considered to comprise relay contacts which may generate an imperfect output signal having the characteristics which result from contact chatter. The delay circuit 604, which is shown in detail in FIG. 7, inserts a delay in the order of 4 milliseconds and also serves to regenerate the delay circuit input pulse to provide a regenerated output pulse DEL on conductors 605.

Figure 7:
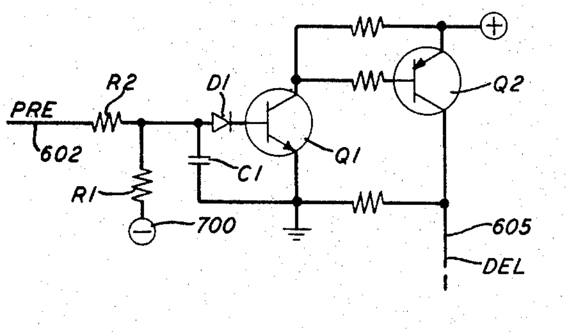
FIGS. 7 through 10 are detailed diagrams of circuit elements employed in FIG. 6.

The operation of the delay circuit of FIG. 7 is as follows. In the absence of a pulse PRE on conductor 602, transistor Q1 is held "off" by the negative potential 700 which is applied through resistor R1 to capacitor C1 and to diode D1. Since transistor Q1 is in the "off" state, transistor Q2 is similarly held in the "off" state and no output is present on conductor 605. When the positive going pulse PRE is applied to conductor 602, the capacitor C1 tends to charge positively through resistor R2 and as the voltage across capacitor C1 begins positive, diode D1 begins to conduct and transistor Q1 is turned "on." This, in turn, completes a path for turning "on" transistor Q2 and thus a positive DEL signal occurs on the output conductor 605. The time constants of the capacitor resistor input circuit of the transistor Q1 are such that irregularities in the PRE input signal are not reflected in the DEL output signal. The DEL output signal has a duration shorter than the duration of the PRE signal, is free of irregularities and is initiated approximately 4 milliseconds after the PRE signal is initiated.

The DEL signal is employed to trigger the interrogation pulse generator 500 to provide interrogation pulse to the memory arrays 606 via the contacts P1–5 through P4–5 of the primary switch selection relays P1 through P4.

Figure 8:
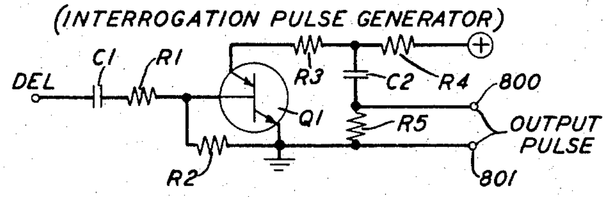

The interrogation pulse generator 500, which is shown in detail in FIG. 8, provides a pulse with an amplitude in the order of two amperes and a rise time of a few hundred nanoseconds. Initially the output terminals 800 and 801 are terminated in the resistor R5 since the switch Q1 is "off." The capacitor C2 is charged from the positive potential source through resistors R4 and R5. A positive DEL pulse when transmitted through capacitors C1 and R1 serves to turn the switch Q1 "on" which causes the capacitor C2 to discharge over a path which includes ground, the conducting switch Q1, resistor R3 and the interrogate windings connected to terminals 800 to ground potential at terminal 801. The switch Q1 turns "off" after the capacitor C1 is charged and C2 is discharged since resistor R4 is made so large that the positive potential applied to resistor R4 is not capable of sustaining the switch Q1 in the "on" state. Capacitor C2 recharges in preparation for the generation of the next interrogate pulse. As shown in FIG. 6, the path through the memory arrays is completed to ground by contacts SL1–5 through SL4–5 of one of the tertiary switch selection relays SL1 through SL4.

The output conductors of the A and B arrays are combined in logic gates as shown in FIG. 6. There is one logic gate for each pair of array output conductors and there are four such pairs shown in the illustrative embodiment. A pair comprises an A output conductor and a correspondingly numbered B output conductor. For example, the output conductors SW10A and SW10B are connected to a logic circuit which includes the OR gate 608. Similarly, the output conductors SW40A and SW40B are connected to the OR gate 607.

Figure 9:
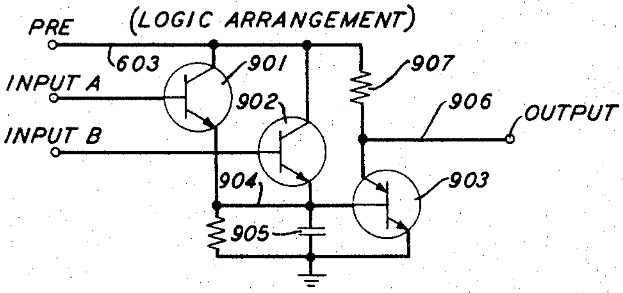

The logic circuits 609 comprise four individual logic arrangements which correspond to the four pairs of array output conductors. Each logic arrangement comprises an OR gate such as 607, a pulse stretcher such as 610 and an AND-NOT gate such as 611. Such a logic arrangement is shown in detail in FIG. 9. As previously indicated, a signal on an output conductor indicates that the associated path is busy and is not available for assignment while the absence of such a signal indicates that the associated path is idle and is available for assignment. The logic arrangement of FIG. 9 comprises the two transistors 901 and 902 which are powered by a PRE signal on conductor 603. In the absence of a signal on a gate input conductor such as input A, the associated transistor such as 901 will be held in the "off" state and the PRE signal is isolated from the conductor 904. Similarly, in the absence of an input signal on the input conductor B, the transistor 902 will be held in a high impedance state. The two transistors 901 and 902 therefore comprise an OR gate between the input conductors (A and B) and the conductor 904. The capacitor 905 serves to stretch a signal passed through either transistor 901 or 902 to assure complete turn on of the transistor 903. In the absence of an output signal from the OR gate, the transistor 903 will be held in the high impedance state and the output conductor 906 will be energized by the PRE signal. An output signal on conductor 906 indicates that the path associated with the A and B memory array output conductors which are connected to the input of the logic arrangement is idle and available for assignment. In the event that either of the links of this path are busy, an output will occur on the OR gate output conductor 904, the condenser 905 will be charged and the transistor 903 will become conductive thus grounding the output conductor 906 to indicate that the associated path is busy and thus not available for assignment. The transistor 903 thus comprises an AND-NOT gate in which the output of the OR gate on conductor 904 comprises one of the two inputs and the PRE signal on conductor 603 as applied through resistor 907 comprises the other input.

Figure 10:
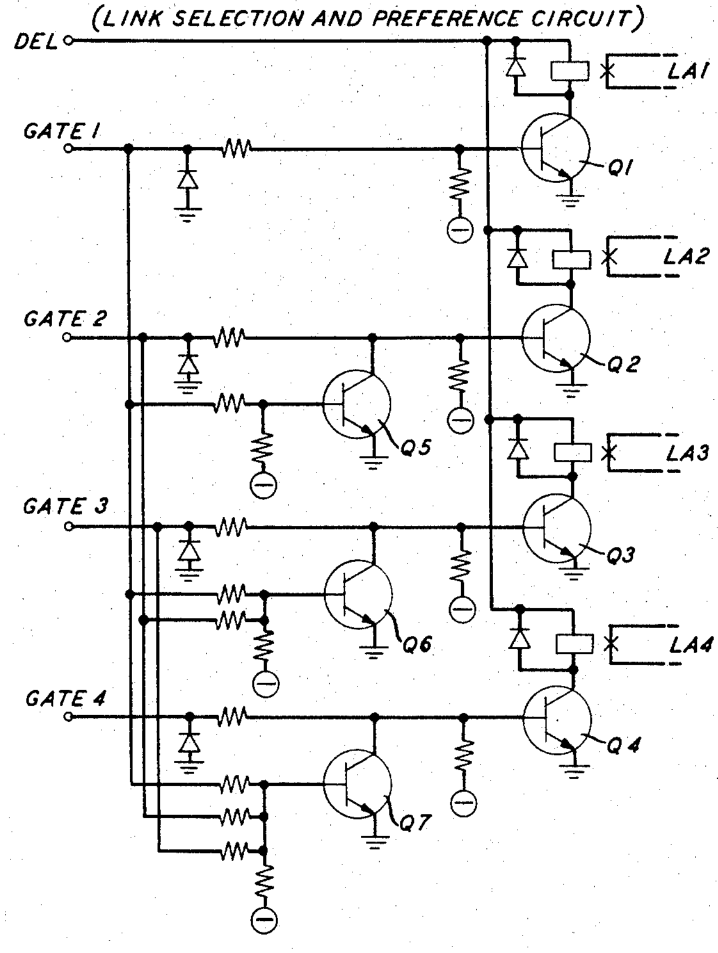

The four output signals of the logic circuit 609 are connected as shown in FIG. 6 to input terminals of the link selection and preference circuit 612. The link selection and preference circuit 612 is shown in detail in FIG. 10 and it serves to operate one of the four relays LA1 through LA4 corresponding to the lowest numbered path available between the primary and tertiary stage switches on which the selected terminals to be interconnected are located. In FIG. 10 the transistors, associated circuits and relays for the possible four inputs are shown. The input conductors labeled gate 1 through gate 4 correspond to the gate output conductors of the logic circuit 609 of FIG. 6. A gate output signal causes the associated path selection relay such as LA1, LA2, et cetera to operate and serves to inhibit the operation of higher numbered relays. For example, an output signal from gate 1 will cause relay LA1 to operate and inhibit the operation of the relays LA2, LA3 and LA4. Similarly, output signals from gates 2 or 3 will cause operation of a corresponding numbered relay such as LA2 or LA3 and inhibit the operation of the higher numbered relays.

The contacts of the relays LA1 through LA4, as previously explained, are included in the conductor CC in each secondary stage switch. When an idle path is found, the lowest numbered one of the relays LA1 through LA4 is operated and this completes a pulsing path for effecting establishment of the selected idle path. As seen in FIGS. 4 and 5, the control path associated with an input link is marked by the operation of an LP relay contact and the control path associated with an output link is completed by the operation of a TP relay contact associated with the selected output terminal. A network path is thus established by completing the selected path through the CC conductor of the secondary stage switch which is to provide the connection. A typical path includes the control source 401, conductor 402, an operated one of the contacts LP1–1 through LP8–1, the row and column control conductors of the No. 1 primary switch, contact P1–1, conductor 403, the control conductors of the *a* input link, conductor CC, a make contact of relay LA1, the control conductor of the third output link of the No. 1 secondary stage switch, conductor 404, contact SL3–1, the row control conductor of the *a* input link and the column control conductor associated with a selected one of the output links of the No. 3 switch of the tertiary stage. The output link is seleced by closure of one of the contacts TP1–3 through TP8–3. It should be noted that only eight LP relays, LP1 through LP8, are required to mark a selected one of the 32 primary stage input terminals since a primary stage switch is selected by operation of one of the relays P1 through P4. Similarly, there are required only eight TP relays, TP1 through TP8, since a particular tertiary stage switch is selected by operation of one of the relays SL1 through SL4. Each LP and each TP relay has four sets of make contacts.

In response to the application of the potentials to the selected input terminal of the first stage switch and the selected output terminal of the third stage switch crosspoints are operated in switches of all three stages to complete a transmission path between input transmission conductors associated with the selected input link of the first stage and transmission conductors associated with the selected output link of the third stage.

As previously explained wih respect to FIG. 2, a transfluxor is set to its blocked idle state by the application of signaling currents to the tip and ring conductors which, as shown in FIG. 2, pass through the C aperture of a transfluxor. After it has been determined that a connection between a selected primary stage input link and a selected tertiary stage output link is no longer required, a signal is transmitted over the tip and ring conductors of the input link through the established connection to a trunk connected to the output terminals of the connected output link. This signal causes the transfluxors of the links employed in that connection to be set to the blocked state and thus prepare these links for further assignment. It should be noted that this action does not physically release the connection between the two terminals but, rather, indicates the availability of the released links. Release of the physical connections to the previously connected input and output links is accomplished at the time that the now idle links are assigned to a new connection.

It is to be understood that the above description is but illustrative of the principles of this invention and that many variations may be made by one skilled in the art without departing from the spirit and scope of the invention.

What is claimed is:

1. A communication switching system comprising:

a switching network comprising a plurality of stages of switches, each switch comprising a plurality of input links, a plurality of output links and a plurality of switching means for selectively interconnecting said input links and said output links, said input links and said output links each comprising only a transmission path and a control conductor for selectively enabling said switching means; and means, including a bistable memory element discrete to each output link coupled to said control conductor and said transmission path thereof, responsive to signals on said control conductor of said output link for setting said memory element to a first busy state, and responsive to control signals on said transmission path of said output link for resetting said memory element to a second idle state.

2. A communication switching system in accordance with claim 1 wherein said switching network provides a plurality of possible transmission paths between any selected input and output terminals and wherein said system further comprises means for interrogating the memory elements of said possible paths to detect an idle network path between a selected input terminal and a selected output terminal and means for controlling the network to establish a connection between said selected input terminal and said selected output terminal via said idle network path.

3. A communication switching system in accordance with claim 2 wherein said system further comprises means for energizing said transmission path to selectively reset the memory elements associated with said network path connecting said selected terminals.

4. A communication switching network comprising a plurality of stages:

each of said stages comprising a plurality of switches, each switch comprising a plurality of input links, a plurality of output links, and a plurality of switching means for selectively interconnecting said input links and said output links, each of said input and output links comprising control conductors and a transmission path, the output links of each switch comprising a switch output link group, the input links of each switch comprising a switch input link group, each link of a switch input link group of all stages except the first being connected to a preceding stage output link, the individual links of a switch output link group being connected to particular input links of different switch input link groups, each output link except the links of the last stage includes a memory element for defining the busy-idle states of the link, the control conductor and the transmission path of an output link being both connected to said memory element, the memory elements being responsive to signals on the control conductor of the output link for setting the memory elment to a first state and responsive to signals on the transmission path of the output link for resetting the memory element to a second state, the memory elements of the output links of each first stage switch comprising a plurality of first interrogation groups, and the memory element of the input links of each switch of the third stage comprising a plurality of second interrogation groups.

5. A communication switching network in accordance with claim 4 further comprising first and second interrogation signal sources for selectively energizing the memory elements of the output links of said first stage switches, and for selectively energizing the memory elements of the output links connected to the input links of said third stage switches, said first and second interrogation signal sources being arranged to generate cooperating first and second potentials.

6. A communication switching network in accordance with claim 4 wherein each interrogation group of said first and second pluralities includes a group interrogation conductor, one end of all of said group interrogation conductors being connected together.

7. A communication switching network in accordance with claim 6 further comprising:

means for selectively energizing the interrogation conductor of one of said first groups and the interrogation conductor of one of said second groups.

8. A communication switching system comprising a network having a plurality of input terminals, a plurality of output terminals, a plurality of switch stages for selectively interconnecting said input terminals and said output terminals:

each of said input terminals being selectively connectable to each of said output terminals by any one of a plurality of different paths through said network, said paths each including a portion of each stage of said switching network and each comprising transmission conductors, a control conductor for controlling the network and a plurality of memory elements defining the busy-idle states of the individual portions of a path, the memory elements being directly responsive to signals on the control conductors to define a first busy state and directly responsive to signals on the transmission conductors to define a second idle state;

and means for sequentially interrogating the memory elements associated with the possible paths between a selected input terminal and a selected output terminal and means for energizing the control conductors of an idle path between said selected input and said selected output terminals.

9. In a switching network having a plurality of stages, transmission paths and control paths interconnecting said stages, and means for maintaining a record of the busy-idle states of said transmission paths through the network, said record means including a plurality of individual memory elements individually associated with said transmission and control paths, means for controlling said memory elements to one memory state by said control paths, and means for controlling said memory elements to a second memory state by said transmission paths.

10. In a switching network having a plurality of stages, each of said stages including a plurality of switches comprising coordinate arrays of crosspoint devices, transmission paths and conductor paths interconnecting said stages, a first group of individual memory elements associated with each array of one stage in one coordinate, a second group of individual memory elements associated with each array of said one stage in the other coordinate, said memory elements being controlled to one memory state by the control paths of said one stage and to a second memory state by the transmission paths of said one stage, and interrogation means for simultaneously sensing the state of one of said first group and one of said second group memory elements.

11. A communication switching network in accordance with claim 1 wherein said bistable memory elements comprise multiaperture magnetic elements having first, second, and third apertures:

said first aperture of each said magnetic memory element being threaded by a link control conductor, said second aperture being threaded by a link transmission path, and said third aperture being threaded by an interrogate winding, an output winding, and a steady state current prime winding.

12. In a switching network, the combination in accordance with claim 9 wherein said memory elements are magnetic memory elements and said control paths and transmission paths are threaded directly through said magnetic memory elements.

13. In a switching network, the combination in accordance with claim 12 wherein said magnetic memory elements have a plurality of apertures therein and said control paths and transmission paths are threaded through different ones of said apertures.

References Cited

UNITED STATES PATENTS

| | | | |
|---|---|---|---|
| 3,019,418 | 1/1962 | Rajchman | 340—166 |
| 3,238,306 | 3/1966 | Bohlmeijer | 179—18 |
| 3,249,699 | 5/1966 | Mol et al. | 179—18 |

KATHLEEN H. CLAFFY, *Primary Examiner.*

LAWRENCE WRIGHT, *Assistant Examiner.*

U.S. Cl. X.R.

340—166